United States Patent [19]

Hinkle

[11] Patent Number: 4,736,835

[45] Date of Patent: Apr. 12, 1988

[54] KNOCK-DOWN FRAME FOR CONVEYORS

[76] Inventor: Donald L. Hinkle, Rte. 1, Box 489, Mt. Clare, W. Va. 26408

[21] Appl. No.: 835,263

[22] Filed: Mar. 3, 1986

[51] Int. Cl.⁴ ............................................. B65G 21/00
[52] U.S. Cl. .............................. 198/860.1; 198/861.1; 198/861.2
[58] Field of Search ...................... 403/353, 399, 409.1, 403/348, 363, 375, 383, 247, 233; 198/860.1, 830, 828, 827, 861.1, 861.2; 211/189

[56] References Cited

U.S. PATENT DOCUMENTS

| 2,699,860 | 1/1955 | Van Dijk | 198/830 |
| 3,747,965 | 7/1973 | Wing | 211/189 X |
| 3,796,503 | 3/1974 | Dawson | 198/860.1 X |
| 3,820,650 | 6/1974 | Garvey | 198/860.1 |
| 4,030,610 | 6/1977 | Alexander | 211/189 X |
| 4,475,648 | 10/1984 | Weeks | 198/860.1 X |
| 4,496,262 | 1/1985 | Sangster | 403/353 |
| 4,685,576 | 8/1987 | Hobson | 211/189 |

FOREIGN PATENT DOCUMENTS 1110430 4/1968 United Kingdom ................ 198/827

Primary Examiner—Randolph A. Reese
Assistant Examiner—Anthony Knight
Attorney, Agent, or Firm—Anthony A. O'Brien

[57] ABSTRACT

A support frame for a conveyor of raw material includes stands at spaced locations along the support frame and interconnecting longitudinal bars between the stands which can be assembled with the stands and separated therefrom without tools or separable fasteners. Receivers on opposite sides of each stand have interlocking engagement with adjacent end portions of two of the stand interconnecting longitudinal bars. The receivers accept the bars through their open sides and spaced locking lugs on each longitudinal bar near its ends straddle side plates of the receivers as the bars rotate into interlocking engagement with the receivers.

12 Claims, 2 Drawing Sheets

KNOCK-DOWN FRAME FOR CONVEYORS

BACKGROUND OF THE INVENTION

1. Technical Field

The present invention relates to knock-down supports and more particularly relates to a knock-down support frame for a coal conveyor or the like. The invention additionally relates to a quick release connector joint between stands of the support frame and stand interconnecting longitudinal bars.

2. Description of the Prior Art

Support frames for a variety of purposes including conveyor support frames and scaffolding frames are well known in the prior art. Most such prior art frames are assembled at least in part by means of separable fasteners, such as drive pins, bolts or sleeves and set screws. Such means require tools for the erecting and disassembling of the frames and the separable fastener elements can be misplaced or lost at the job site. Furthermore, the connecting joints of many prior art frame structures, scaffolds and the like are less than adequately safe in addition to being expensive to erect and take apart.

SUMMARY OF THE INVENTION

The present invention can be summarized as a knock-down support frame for conveyors or for other purposes characterized by convenience and extreme simplicity in its erection and dismantling without the requirement for tools and/or separable fasteners. In its essence, the invention is embodied in a very secure, easily releasable and entirely safe connection or joint between spaced stands of a support frame and interconnecting bars between the stands. The interconnecting bars are assembled with receivers of the frame stands and released therefrom by a simple placement of end portions of the bars through open sides of the receivers followed by limited rotation of the bars on their longitudinal axes to move rigid locking elements of the bars into secure, but easily releasable, engagement with parts of the receivers.

An important object of the present invention is to provide a knock-down support frame for conveyors or for other purposes which is safer and more secure, much more convenient and more economical than the known prior art.

Another object is to provide a frame construction which embodies an improved quick-release joint between frame stands and their interconnecting side bars.

Another object of the invention is to provide a frame construction joint which can be operatively engaged or separated by a simple manipulation of connecting parts without the use of tools or separable fasteners.

Other objects, advantages and features of the invention will be apparent from the following description of the preferred embodiment taken in conjunction with the accompanying drawings.

DESCRIPTION OF THE PREFERRED EMBODIMENT

Figure 1:
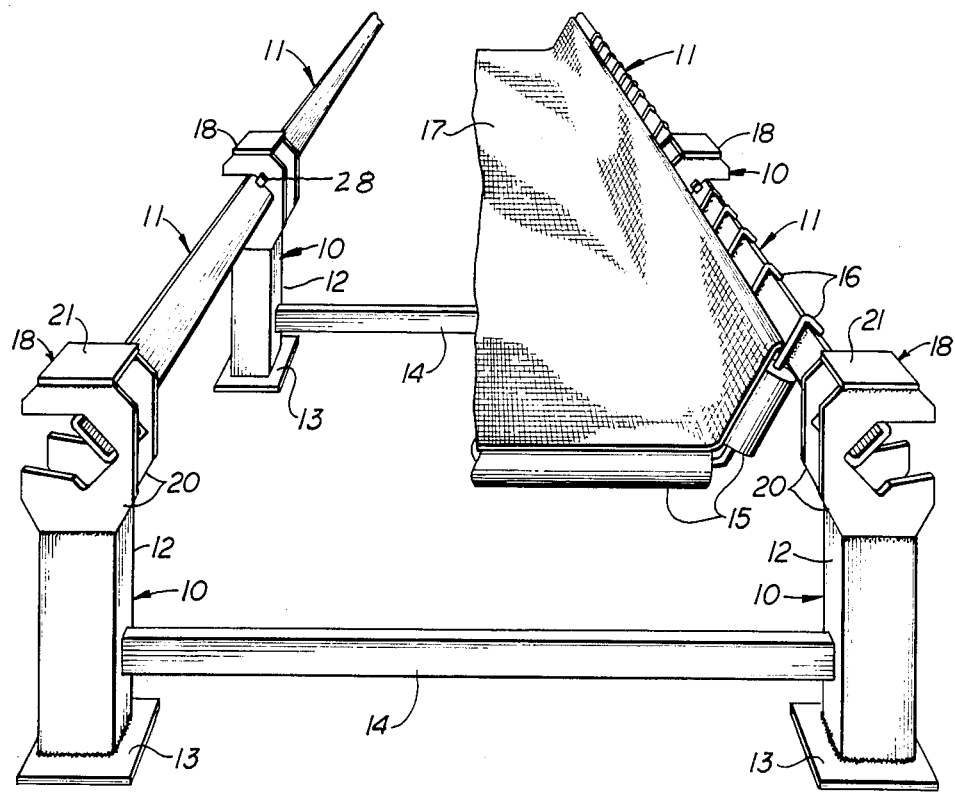
FIG. 1 is a fragmentary perspective view showing a conveyor structure in which the present invention is embodied.
Figure 2:
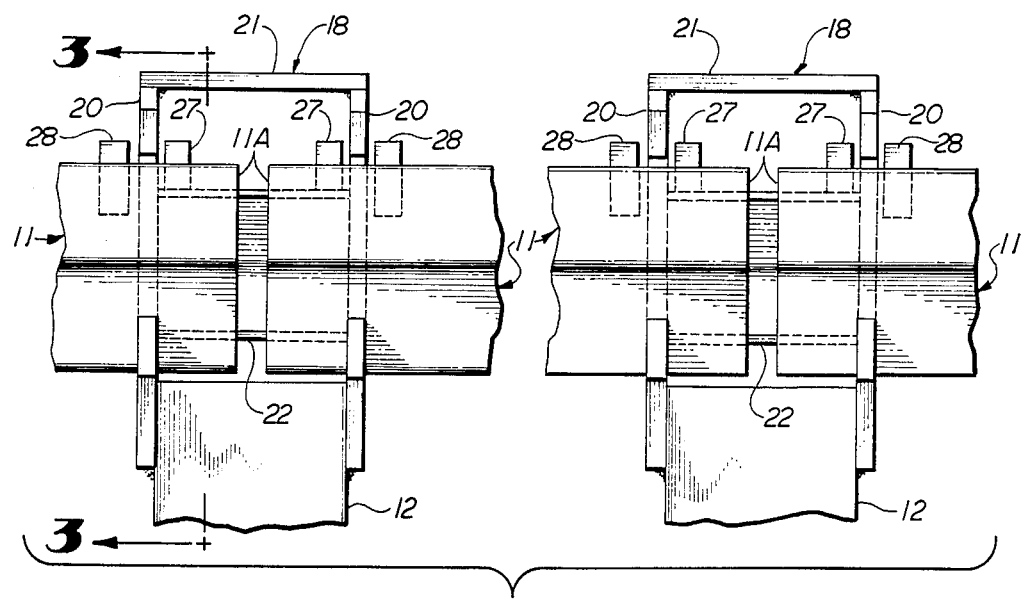
FIG. 2 is a fragmentary side elevation of a frame structure and joint according to the invention.

As shown in the drawings, wherein like numerals designate like parts, a frame for a conveyor of coal or other raw material comprises a series of stands 10 at spaced intervals along the length of the conveyor intervened by elevated longitudinal connecting bars 11, preferably of square cross section and being tubular.

Each stand 10 of the support frame comprises a pair of uprights 12 at its opposite sides having suitable foot plates 13 and being rigidly interconnected near their bottoms by sturdy cross members 14.

As shown in FIG. 1, a conveyor for coal or the like comprises a multiplicity of troughing rollers 15 suspended from the longitudinal bars 11 between stands 10 by suspension arms 16 or similar means. A troughed conveyor belt 17 rests on the rolls 15, as shown. Coal or the like is received on the moving belt 17 and is carried thereby to the required destination.

The essence of the present invention resides in unique safe and secure joints between the several stands 10 of the frame and the stand interconnecting bars 11. More particularly, each stand comprises at the top of its uprights 12 a pair of opposite side receivers 18 for adjacent end portions 11a of the longitudinal bars 11. The receivers have outer side entrance openings 19 through which the longitudinal bar end portions 11a may enter and leave the receivers 18 laterally. The interior sides of the receivers 18 are closed, as shown in the drawings. Since the receivers 18 are identical in construction, a description of one will serve to describe all of them.

Each receiver 18 comprises a pair of rigid spaced parallel jaw plates 20 fixed as by welding to opposite faces of the adjacent upright 12 in overlapping relationship to the latter. At their tops, the jaw plates 20 are rigidly interconnected by cap plates 21 welded thereto. A ninety degree angle web 22 rigidly connected between the jaw plates 20 defines the interior closed side of the receiver 18.

The two jaw plates 20 of each receiver 18 are profiled to include upper horizontal edges 23, lower sloping edges 24 disposed at approximately fifteen degrees to the horizontal and rear or interior convergent edges 25 in right angular relationship. The space between the jaw edges 23 and 24 defines the entranceway 19 of the receiver 18 through which each square bar 11 can enter the receiver with a pair of its flat walls in parallel relationship with the horizontal edge 23, as shown in broken lines in FIG. 3.

Figure 3:
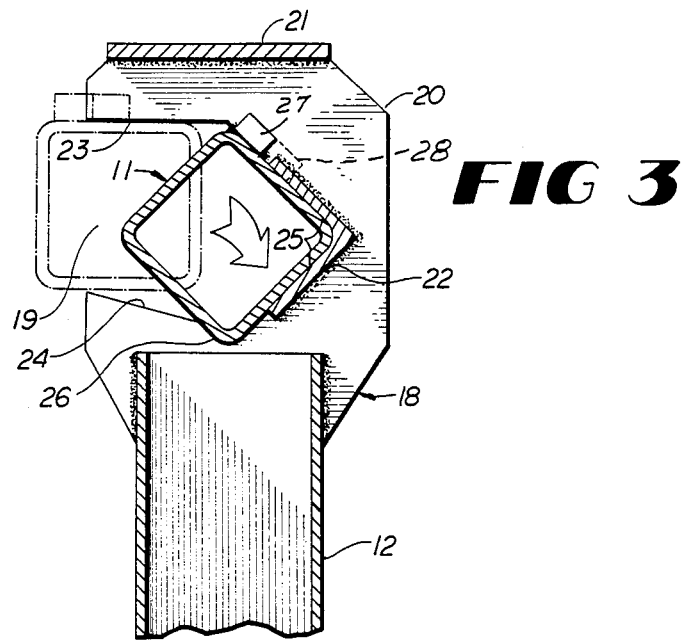
FIG. 3 is a vertical section taken on line 3—3 of FIG. 2.
Figure 4:
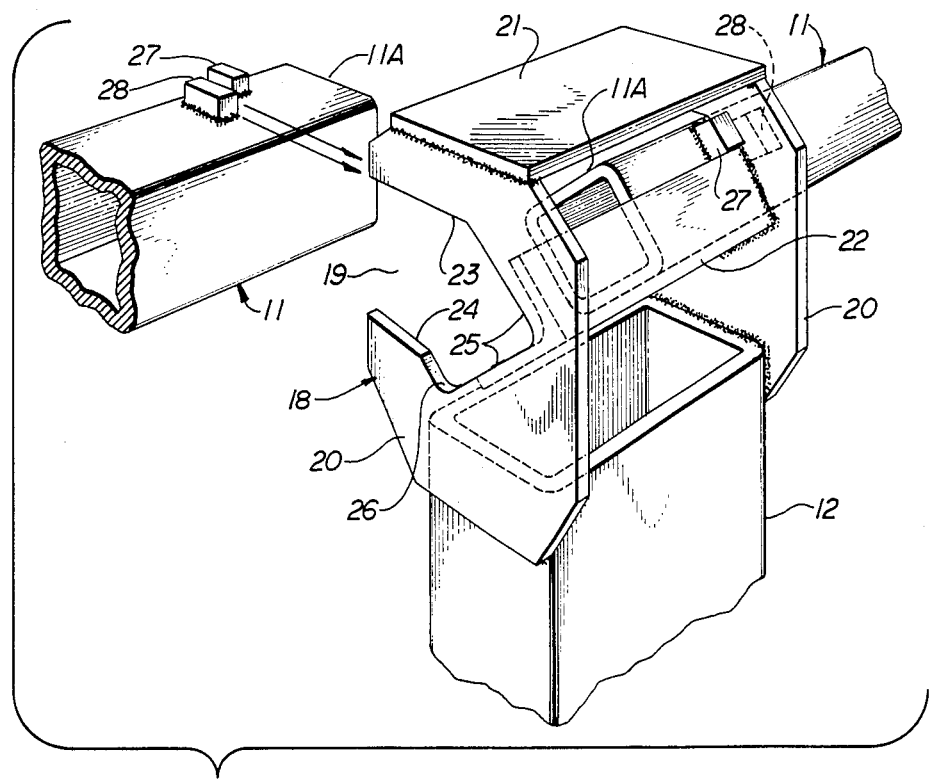
FIG. 4 is a fragmentary perspective view showing the frame construction and joint depicted in FIGS. 2 and 3.

After each square bar 11 passes through the entranceway 19 of the receiver 18, it is rotated 45° on its longitudinal axis to the position shown in cross section in full lines in FIG. 3. In this position, one square corner of the bar 11 is seated solidly in the 90° angle web 22 and the lowermost corner of the bar is seated in a notch 26 in the adjacent jaw plate 20 where the sloping edge 24 essentially meets the interior or rear edge 25.

Each bar 11 is provided near its opposite ends on one flat wall thereof with a pair of fixed laterally spaced parallel locking lugs 27 and 28 welded thereto. The shorter lug of the pair is the lug 27, which is nearest the adjacent end of the bar 11. The longer lug 28 is slightly more distant from the adjacent end of the bar 11 and the two lugs 27 and 28 are longitudinally staggered. The lateral space between the two lugs 27 and 28 allows the lugs to straddle the adjacent jaw plate 20 of the receiver 18, as shown in the drawings, as the bar 11 is rotated into its fully engaged position in the receiver, as described above.

The arrangement provides a safe and secure connection between each end portion of each longitudinal bar 11 with one of the receivers 18 of the frame structure. It is impossible for the assembled bars 11 to move longitudinally on their axes relative to the receivers 18 and stands 10. The bars 11 cannot separate from the receivers until they are positively rotated counterclockwise, FIG. 3, 45° from their fully seated positions in the receivers 18. Following such counterclockwise rotation, the bars 11 are again at the position shown in broken lines in FIG. 3 and can be slipped out of the receivers 18 through the entrance passageway 19. No tools are required in the erection and dismantling of the framework and no screws, pins or other separable fasteners are employed.

It will be understood that each receiver 18 receives end portions of two adjacent longitudinal bars 11 and exactly the same arrangement exists on the opposite sides of each vertical stand 10 which includes two of the uprights 12 and receivers 18. As shown in FIG. 1, the receivers 18 at the opposite sides of each stand 10 have their entrance passageways 19 opening oppositely outwardly with respect to the longitudinal center line of the conveyor framework.

By virtue of the described readily releasable connections between the stands 10 afforded by the longitudinal bars 11 and their opposite end locking means, the assembled frame is rendered stable and very strong regardless of the environment in which it may be used. The advantages of the invention over the prior art should now be readily apparent without the necessity for further description.

With further reference to the drawings, it should be noted that the locking lugs 27 are disposed above the top edges of the angle web 22 when the square bars 11 are fully in engagement with the seat defined by the angle web 22 and jaw plates 20.

Since many modifications, variations and changes in detail may be made in the above-described embodiment, it is intended that all matter described in the foregoing description or shown in the accompanying drawings be interpreted as illustrative and not in a limiting sense.

I claim:
1. In a knock-down framework,
  an upright member,
  a receiver on the upright member and having a side opening entranceway, the receiver having a profiled jaw plate defining a polygonal receiver seat in communication with said entranceway,
  a polygonal connecting bar of matching cross section with the polygonal seat and adapted to enter and engage the seat of the receiver by passing through said entranceway with a flat face of the connecting bar disposed parallel to an edge of the entranceway followed by rotation of the connecting bar in one direction to cause the bar to fully engage said seat,
  a pair of spaced fixed locking lugs on the exterior of one flat face of the connecting bar near one end thereof and straddling said jaw plate of the receiver as the connecting bar is moved into engagement with said seat to releasably lock the connecting bar to the receiver, and
  said connecting bar having a substantially square cross section and said polygonal seat being substantially square, and said side opening entranceway being restricted in its width so that the square connecting bar can pass therethrough only when a pair of its flat exterior faces are parallel to said edge of the entranceway.

2. In a knock-down framework as claimed in claim 1 and said receiver including a pair of said jaw plates in spaced parallel relationship at the opposite ends of said seat, whereby a pair of said connecting bars having said locking lugs can be releasably locked to the receiver in coaxial alignment across the upright member substantially at right angles thereto.

3. In a knock-down framework as claimed in claim 1, and said square polygonal seat and square connecting bar when fully engaged having vertically aligned upper and lower corners and horizontally aligned opposite side corners.

4. In a knock-down framework
  an upright member,
  a receiver on the upright member and having a side opening entranceway, the receiver having a profiled jaw plate defining a polygonal receiver seat in communication with said entranceway,
  a polygonal connecting bar of matching cross section with the polygonal seat and adapted to enter and engage the seat of the receiver by passing through said entranceway with a flat face of the connecting bar disposed parallel to an edge of the entranceway followed by rotation of the connecting bar in one direction to cause the bar to fully engage said seat,
  a pair of spaced fixed locking lugs on the exterior of one flat face of the connecting bar near one end thereof and being adapted to straddle said jaw plate of the receiver as the connecting bar is moved into engagement with said seat to releasably lock the connecting bar to the receiver,
  said connecting bar having a substantially square cross section and said polygonal seat being substantially square, and said side opening entranceway being restricted in its width so that the square connecting bar can pass therethrough only when a pair of its flat exterior faces are parallel to said edge of the entranceway,
  said receiver including a pair of said jaw plates in spaced parallel relationship at the opposite ends of said seat, whereby a pair of said connecting bars having said locking lugs can be releasably locked to the receiver in coaxial alignment across the upright member substantially at right angles thereto, and
  said receiver further including a right angular member connected between said jaw plates and defining with profiled edges of the jaw plates said square seat for said square connecting bar.

5. In a knock-down framework as claimed in claim 4, and a cap plate for said receiver connected between the tops of said profiled jaw plates, said jaw plates being parallel and being disposed in vertical planes.

6. In a knock-down framework as claimed in claim 4, and said profiled edges including upper substantially horizontal edges, lower sloping edges opposite the upper horizontal edges and pairs of convergent substantially right angular interior edges arranged opposite said entranceway.

7. In a knock-down framework as claimed in claim 6, and said jaw plates further having seating notches for a lower corner of said connecting bar at the juncture of the lower sloping edges with the lower convergent interior edges.

8. A knock-down frame for a raw material conveyor comprising a series of stands in spaced relationship along the length of the conveyor each having a pair of opposite side uprights and side opening receivers on the uprights near the tops thereof, said receivers of each stand having polygonal seats and having opposite side jaw plates provided with profiled edges leading into said seats, said seats of the receivers of the series of stands being in coaxial alignment along said knock-down frame, and opposite side coaxial longitudinal bars extending between and releasably interconnecting and stabilizing said series of stands and being coaxially aligned along the opposite sides of said frame and having polygonal cross sections matching said polygonal seats and being engageable with the seats, said bars having pairs of spaced locking lugs fixed on the exteriors of corresponding side walls thereof near the opposite ends of the bars and said lugs straddling the jaw plates of said receivers lockingly when the bars are introduced through the side openings of the receivers and rotated into engagement with said polygonal seats.

9. A knock-down frame as claimed in claim 8, and said polygonal seats and said longitudinal bars being substantially square, and the side openings of said receivers leading into said seats and having heights whereby said square bars can pass into and through the side openings only when an opposite pair of side walls of the bars are placed parallel to one edge of each side opening.

10. A knock-down frame as claimed in claim 9, and the square seats and square bars when fully engaged having vertically aligned top and bottom corners and horizontally aligned opposite side corners on a horizontal axis generally in alignment with the side openings of the receivers.

11. In a knock-down framework for a conveyor, an upright support member, an elevated receiver fixed on the support member and having a polygonal seat and a side opening leading to the seat, the receiver having opposite side spaced parallel jaw plates including profiled edges defining said side opening and defining margins of the polygonal seat, and a pair of coaxially aligned frame bars of polygonal cross section matching and being engageable with the polygonal seat and having end portions insertable laterally through the side openings and then being rotatable into engagement with the seat, said end portions carrying on corresponding exterior faces thereof pairs of spaced rigid locking lugs fixed to said faces and straddling said jaw plates lockingly and releasably as said frame bars are rotated into engagement with said seat.

12. In a knock-down framework as claimed in claim 11, and said polygonal seat being defined by an angle member connected between said jaw plates below the tops thereof, whereby said pairs of lugs can straddle and interlock with portions of the jaw plates above said angle member when said frame bars are fully engaged with said seat.

* * * * *